July 19, 1927.

H. FOERSTERLING 1,635,988

METHOD OF MAKING AIR GAS

Filed March 5, 1925

INVENTOR,
Hans Foersterling,
BY
Henry J. Luake,
ATTORNEY.

July 19, 1927.
H. FOERSTERLING
1,635,988
METHOD OF MAKING AIR GAS
Filed March 5, 1925
2 Sheets-Sheet 2
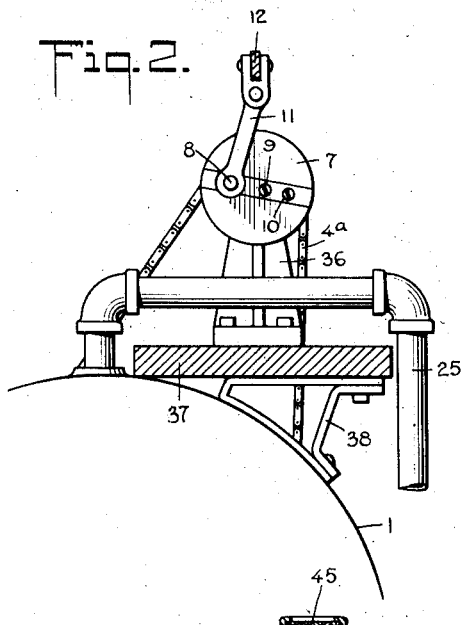
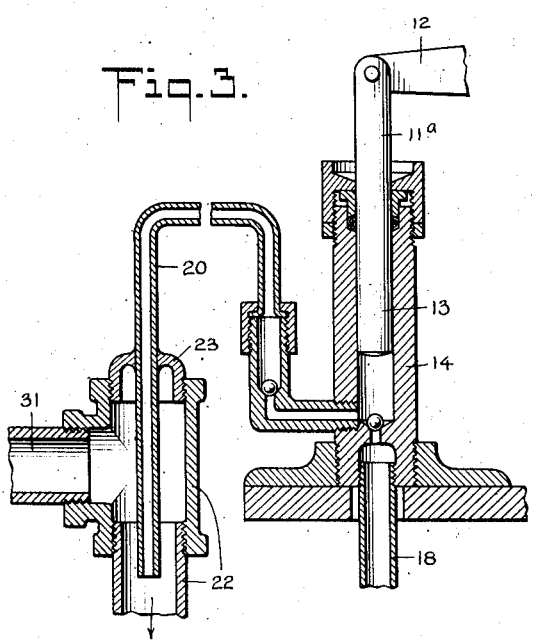
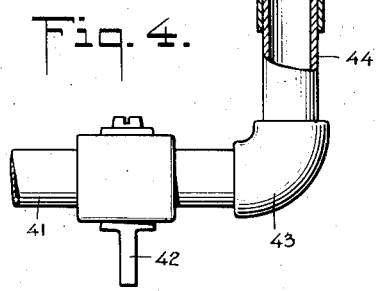
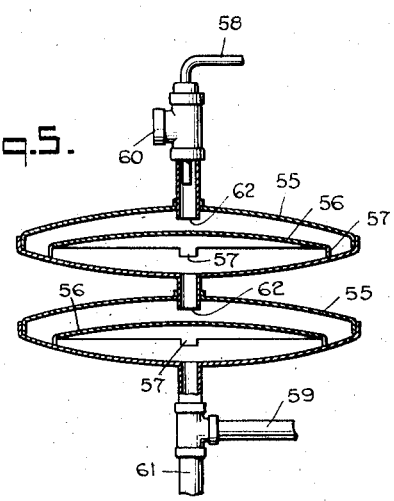
INVENTOR,
Hans Foersterling,
BY
Henry J. Lucke,
ATTORNEY.

Patented July 19, 1927.

1,635,988

UNITED STATES PATENT OFFICE.

HANS FOERSTERLING, OF JAMESBURG, NEW JERSEY.

METHOD OF MAKING AIR GAS.

Application filed March 5, 1925. Serial No. 13,068.

This invention refers to an improved method of and apparatus for making air gas from an inflammable volatile liquid.

It has been heretofore proposed to make air gas from inflammable liquids, as for instance gasoline, by charging gasoline into a container which acts in a two-fold capacity, firstly, as a storage vessel for same and secondly, as a vaporizer. Air is pumped into such container by means of a fan driven by a counterweight or water wheel, whereby the air becomes saturated with the gasoline vapor and is then usually conducted to a mixing chamber the resulting air gas mixture is then ready for use. As air takes up at first the more volatile constituents of the gasoline, leaving behind the less volatile constituents, the resulting air gas varies in uniformity by reason of the variation of the proportions of its constituents and in the effort to overcome this serious defect various kinds of "equalizers" have been designed. However such "equalizers" are more or less complicated, expensive and are unsatisfactory in producing a truly uniform gas. Furthermore, there usually remains in the container a certain amount of unvaporized gasoline which defeats the attainment of a uniform air gas. The above results are derived notwithstanding that the gasoline used in these air gas machines may be of high quality, such as gasoline testing about 85° Bé., which costs about double the price of standard motor gasoline, testing only 58° Bé.

Pursuant to my invention, the gasoline is discharged into a suitable vaporizer at a determined rate of flow and preferably downwardly in the vaporizer as a thin stream; the air is supplied to the vaporizer in a counterdirection of flow and preferably upwardly through the vaporizer. The rate of flow of the air is regulated to derive a gas of substantially uniform quality and of the desired degree of heating value. The vaporizer is constructed to provide a radiating surface of sufficient extent to overcome the lowering of the temperature within the vaporizer due to vaporization of the volatile constituents of gasoline, thereby maintaining the temperature of the gasoline substantially corresponding to the temperature of the air at the location of entrance into the vaporizer. The residue or unvaporized constituents of the gasoline are removed and preferably continuously from the vaporizer.

Further features and objects of the invention will be more fully understood from the following detail description and the accompanying drawings, in which Fig. 1 is a view largely in vertical section and partly in side elevation of one form of my invention;

Fig. 2 is a section on line 2—2 of Fig. 1, on an enlarged scale;

Fig. 3 is a detail vertical section of one form of gasoline pump and associated parts on an enlarged scale;

Fig. 4 is a detail side elevation, partly in vertical section, of one type of heating burner for the employment of my form of air gas; and Fig. 5 is a detail side elevation with parts in section of a modified form of vaporizer.

Figure 1:
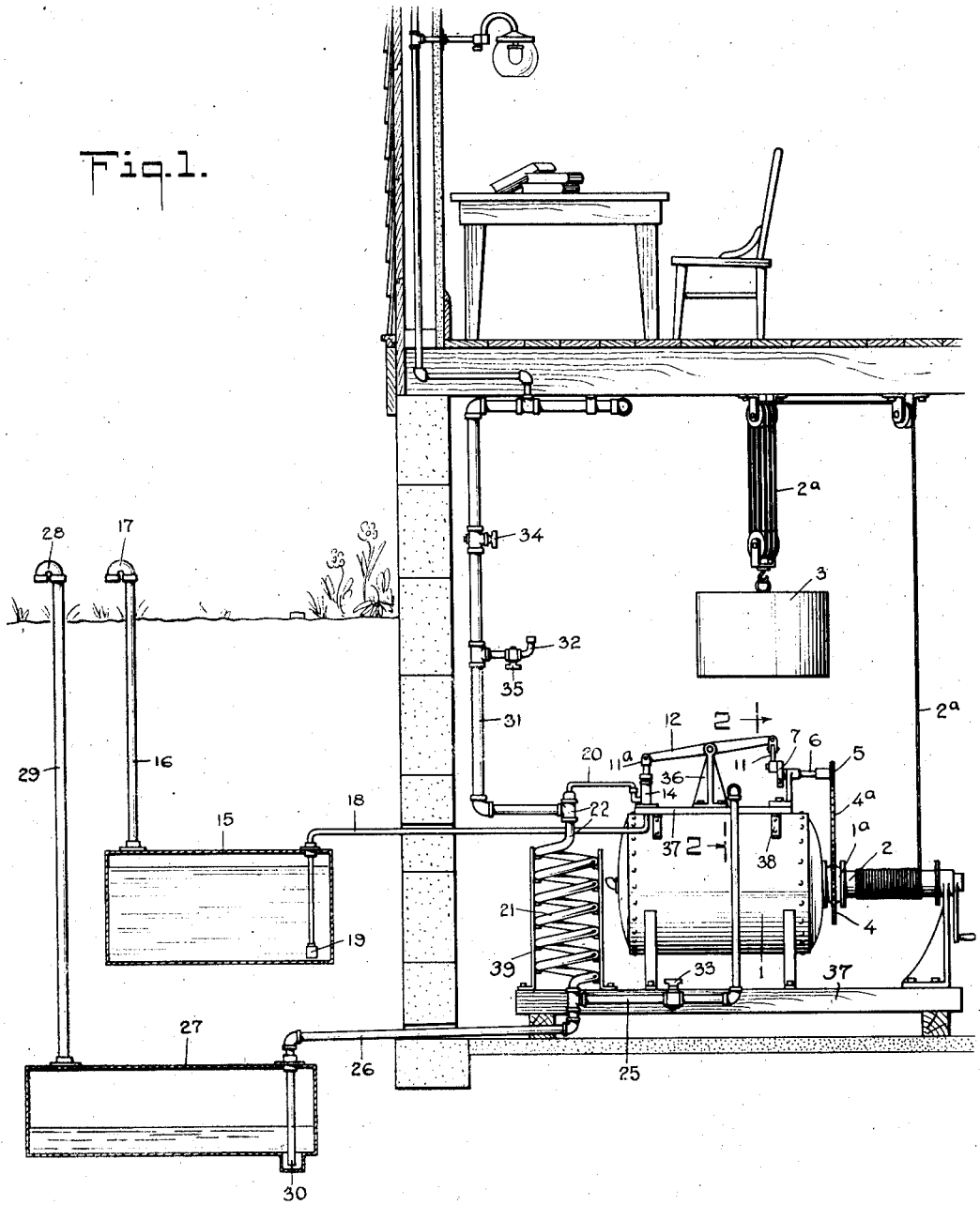

Referring to Fig. 1 the numeral 1 represents a form of blower as is commonly used in the manufacture of air gas; the fan or blower 1 is provided at its back with an air intake (not shown) and at its front with an axle connected by suitable means such as the winch 2 actuated by the counterweight 3 by means of the wire rope 2ª wound on the winch 2. On the shaft 1ª of the internal wheel of the fan or blower, I mount sprocket wheel 4 which drives by means of a chain 4ª the sprocket wheel 5 secured to one end of the countershaft 6 by a key or the like. At the other end of the countershaft 6 is secured the eccentric or cam 7. The hub of the eccentric 7 is regulated by means of the keyed slide 8, see Fig. 2, held in position by two set screws 9, 10, or some equivalent construction. The eccentric 7 drives by means of the lever 11, the rock shaft 12 and lever 11ª the piston 13 of the pump 14, see Fig. 3. 15 represents a storage tank for the inflammable liquid, located preferably underground. The tank 15 is provided with a breather pipe 16 which serves at the same time as its filling means upon unscrewing the bend 17. The tank 15 is connected with the pump 14 by means of pipe line 18 provided at its end within the tank 15 with the foot valve 19.

The overflow 20 of pump 14, see Fig. 3, is connected with the coil 21. The intake line 20 of the coil 21 is preferably welded to the nipple 23. The lower end of coil 21 is connected by means of the air line 25 with the outlet of fan or blower 1. By means of the pipe line 26 the bottom of the coil 21 is connected with overflow tank 27. The tank 27 collects the unvaporized residue of the gasoline as described more particularly hereinafter, and is emptied as required by unscrewing the bend 28 from its breather pipe 29. The pipe line 26 is sealed within the tank 27 against the flow of the gas by means of its seal 30. The gas main 31 is connected to the upper end of the coil 21 as shown and is provided with a test burner 32.

The cock 33 controls the air line 25 leading to the coil 21. The cock 34 controls the main gas line 31 and the cock 35 controls the test burner 32.

I now describe one method of carrying out my invention, but in doing so it must be understood that the same serves merely as an example of illustrating my process and the formation of my air gas.

The fan 1 is filled with a suitable sealing fluid to the desired height. The storage tank 15 is filled with standard motor gasoline and enough gasoline is initially poured into storage tank 27 to cover the seal 30. The cocks 33, 34, and 35, are now closed. The counterweight 3 is then wound up manually or otherwise. The cock 35 of the test burner 32 is now opened. The fan 1 is set into motion and at the same time the gasoline pump 14 through the gearing including the sprocket wheels 4 and 5 pumps gasoline from the tank 15 into the coil 21.

Upon regulating the pump 14, so that it delivers 2.64 gallons of regular motor gasoline, of a specific gravity of 0.746 or approximately 57° Bé., per 1000 cubic feet of air passed through the coil 21, the derived gas is of uniform quality, and burns with a non-smoking blue flame having a green inner cone, thus indicating complete combustion, that is, forming carbon dioxide and water vapor, without any additional air supply.

I have further found that of every 2.64 gallons of gasoline passed through the coil substantially 0.92 gallons are vaporized and substantially 1.72 gallons are recovered in the storage tank 27 as the unvaporized portion of the gasoline.

The recovered unvaporized portion of the gasoline shows a specific gravity of approximately 0.776 or 50° Bé. and is usable in a gasoline engine for the production of power.

In carrying out the aforesaid process, I used a slow-speed, low-pressure fan having a diameter of 13 inches by a length of 13 inches. The capacity of the fan was tested by a fluid positive gas meter and found to be .75 cubic foot per revolution. A gasoline pump as adopted for engine work, transferred the gasoline from the storage tank into the coil 21. Its motion was so regulated that for each revolution of the fan it made four piston strokes of the piston. The coil was made of one inch wrought iron pipe, outside diameter of the coil measuring 12 inches, the coil had seven complete windings in all; each winding was separated from the other by a distance of one-half an inch. This allowed a good radiation of the cold produced by the vaporization of the gasoline. With an outside air temperature of 17° C. and running the fan at the rate of one-half a revolution per minute, the temperature of the air gas produced showed also 17° C., indicating that all of the cold generated had been radiated through the walls of the coil. By using a copper coil instead of an iron one, greater capacities can be easily obtained for greater productions.

From the above, it will be seen that I can produce 1000 cubic feet of air gas wtih 2.64 gal. of motor gasoline and that I actually vaporize 0.92 gal. and recover 1.72 gal. which can be used for other purposes.

Assuming that 1 gal. of vaporized gasoline weighs 6 lbs. and that 1 lb. motor gasoline produces 20,000 B. t. u., then the vaporized gasoline corresponds to 110,400 B. t. u. per 1000 cubic feet, or 110 B. t. u. per one cubic foot.

The claim of the present gas machine manufacturers is that 1000 cubic feet of air gas are obtained by vaporizing 3 gals. of gas machine gasoline. As this quality of gasoline weighs only 5.5 lbs. per gal., the 3 gals. are equal to 16.5 lbs., which at 20,000 B. t. u. per pounds equal a total of 330,000 B. t. u., i. e. 330 B. t. u. per one cubic foot.

This corresponds well with European practice, where 250–300 grams of low boiling gasoline is added per one cubic meter of air, resulting in a gas which contains approximately 2900 cal. per one cubic meter equal to about 329 B. t. u. per one cubic foot. (See Strache: Die gas Beleuchtung & Die Gas Industrie, page 687, Verlag von Fried. Vieweg & Sohn, Braunschweig, Germany, 1913.)

It is clear that a gas containing 330 B. t. u. per cubic foot requires an additional supply of air in order to obtain complete combustion.

From an economical standpoint the following calculation can be made:

1,000 cubic feet of air will absorb under normal air conditions as they exist for instance in a cellar, from 2.64 gal. motor gasoline, as it is sold today on the market about 1 gal. of the vaporized constituents of gasoline depending on the minor variations of temperature, and resulting in a gas containing approximately 110 B. t. u. per cubic foot. But if I add 2.64 gal. of gas machine gasoline to 1,000 cubic feet of air, then the whole 2.64 gal. will be taken up by the air, resulting in a gas of 330 B. t. u.

Motor gasoline is sold today around 20¢ per gal., and gas machine gasoline at 35¢ per gal.

According to present practice 1,000 cubic feet of air gas made from gas machine gasoline contains approximately 330,000 B. t. u. and require 3 gal. at 35¢ at a cost of $1.05. Hence 10,000 B. t. u. cost 3.2¢.

With my process I produce a gas containing per 1,000 cubic feet 110,000 B. t. u. for which I require 0.92 gal. at 20¢, i. e., or a cost of $0.184. Hence 10,000 B. t. u. cost only 1.67¢ or a saving of nearly 100%.

However this saving in money is not the only advantage, which my process effects. A principal object of my invention is to furnish to the farmer and for the household located away from the centers of general gas distribution an inexpensive apparatus of such simple design that it can be operated by the average layman without risk of fire or explosion.

As far as the fire risk is concerned, the apparatus has been so designed that the fire risk is practically eliminated. The two storage tanks, the one for the motor gasoline, and the other for the recovered non-vaporized portion of the gasoline, are located underground and away from the building. Only so much gasoline is lifted from the storage tank and brought into the house as is required in any given time and is then almost instantaneously converted into gas. Considering the fact that only 2.64 gal. of gasoline per 1,000 cubic feet of air are used and that an average household burner as is used for kitchen work or for illumination purposes does not require much more than from 20 to 30 cubic feet per hour, it will be found that the amount of gasoline which is introduced into the house at any given time is a fraction of the content of the bottle of gasoline which is found practically in every household for removing spots from clothes or the like.

As far as an explosion risk is concerned, it must be considered that the lower explosion limit of gasoline vapor is 3 to 5 per cent by volume. An air gas containing 3 gal. of gasoline in vapor form per 1,000 cubic feet figures to approximately 8 per cent by volume. While such a gas escaping into a small confined room may cause an explosion, when brought suddenly into contact with a flame or spark, my gas containing less than 1 gal. of gasoline in vapor form per 1,000 cubic feet, i. e., equal to about 2 to 3 per cent by volume simply can not be ignited when it becomes further diluted with air.

All the gas burners which are used today for kitchen work and illuminating purposes, regardless of whether they are used with air gas or illuminating gas are provided with a means for regulating the supply of air required for complete combustion, as both gases will burn with a yellow flame if air is not added. It is further well understood that the hottest flame, hence the greatest economy, is obtained by regulating the air supply so that the flame shows a greenish center surrounded by a blue mantle. But the practice of actual regulation of gas burners by many housewives and other users of the gas stove by adjusting the flame for maximum heating value, is substantially nil. In general, the air regulation is once set and the gas cock is opened more or less depending upon the rapidity with which a utensil shall be heated. Very few people stop to think that the air supply should be regulated every time a gas cock is turned lower or higher.

My apparatus supplies an air gas which is regulated inherently, that is, by its own composition to obtain ideal conditions for complete combustion without any further regulation, and, further, these ideal conditions are maintained automatically as the machine operates.

For simplicity of assembly, the standard 36 of the rocking beam 12, the pump 14 and the associated parts may be mounted on the platform 37 and supported by a pair of brackets 38 on the casing of the fan or blower 1.

The convolutions of the coil 21 may be held in spaced relation by any suitable frame 39 which is open to the atmosphere to provide the desired radiation. The frame 39 of the coil 21 may be mounted with the fan or blower 1 on the support 37.

I have found that when there is wanted a high flame as it is commonly used in a laboratory, I prefer to use an arrangement as shown in Fig. 4, where 41 indicates the gas main, 42 a regulating cock, 43 an elbow and 44 a nipple provided at its top with a cap of wire gauze 45.

For use in the kitchen and like heating uses burners of various constructions may be employed. When a nonsmoking blue flame is desired at all times it is advisable not to provide any secondary air supply for the burner.

It is also well understood that the ideal flame for the Welsbach burner is the Bunsen flame. My gas produced by my process gives a bright light when burned with a Welsbach or like mantle, provided, however, that the air supply device is omitted, to prevent the supply of any secondary air to the burner.

The vaporizer may be modified in form and construction as desired to attain the objects of my invention. In Fig. 5, I have shown a device which has proven very effective for my purposes. 55 represent a series of circular shells, having tops and bottoms slightly curved and communicating successively with one another within each shell is a slightly downwardly curved tray 56, suitably supported on spaced feet 57. Gasoline enters through the pipe line 58 and air through the pipe line 59; the resulting air gas leaves through the pipe line 60 and the recovered unvaporized portion of the gasoline flows through the pipe line 61. By means of each nipple 62 of a shell 55, the gasoline is carried to the center of its curved tray 56, forming an ever moving thin film over which the air passes in countercurrent direction, and resulting in a rapid saturation of the air with the gasoline vapor. The slightly tapering construction of each shell 55 and its relatively large diameter as compared with its height provides for a rapid radiation of the relatively higher temperature of the atmosphere to the interior of each shell arising from the reduction of temperature within each shell due to the vaporization of the gasoline. This is of greatest importance especially at low air temperatures, under which conditions the economy of the whole apparatus rests more or less on this factor, as will be seen from the following table extracted from Landolt-Boernstein, Physikalische Tabellen, page 137, Verlag von Julius Springer, Berlin, 1905, and showing the vapor tensions of the principal ingredients of gasoline.

| Temp. °C. | $C_5H_{12}$ | $C_6H_{14}$ | $C_7H_{16}$ |
|---|---|---|---|
| −10 | 114 mm. | 25.9 | |
| 0 | 183.2 | 45.45 | 11.45 |
| +10 | 281.8 | 75.0 | 20.5 |
| +20 | 420.2 | 120.0 | 35.5 |

It is obvious from the above that the vaporizer should neither contain any absorbent surface nor be filled with any absorbent material, as has been heretofore proposed, since any absorbent surface delays the exchange of the cold produced in the interior of the vaporizer with the temperature of the air surrounding the vaporizer. Thin smooth metal surfaces as shown for the coil and the disc vaporizer yield excellent results.

For this reason I prefer to locate the apparatus in the cellar of the house where the temperature changes are the least in extent and occurrence.

It is obvious that the apparatus will stop operating when the weight reaches the floor. For the average farmer and man of moderate means, the use of multiple blocks will reduce the times of winding up the machine so that this work has to be done only once a day or even less. Under certain circumstances a pipe casing can be driven in the ground to allow the weight a greater travel therein.

For the man of greater means or for industrial purposes a water wheel can be used, or where water could not be used to good advantage a very simple device can be installed whereby the weight when it reaches a certain point on its way downward throws in and closes a switch which starts a small motor mechanically geared to a suitable hoisting apparatus for winding up the rope again until the weight reaches a certain point on its way upward at which the switch is opened to stop the motor.

In either way the apparatus can be made so that it operates perfectly automatically, excepting the occasional filling and emptying of the storage tanks.

If for any reason a yellow flame is required, this of course can also be produced with my method by regulating the length of the stroke of the pump, namely by shifting the adjustable hub of the eccentric 7 to the necessary position. It is obvious that in this case the consumption of standard motor gasoline will increase beyond 2.64 gal. of gasoline per 1000 cubic feet of air.

From the above it will be apparent that my method affords the production of a uniform air gas of any desired or any predetermined heating value by exposing in a vaporizer a moving thin stream of gasoline at atmospheric temperatures to a current of air of low pressure and in counterdirection therewith, and in quantities substantially not greater than are required for deriving the desired or predetermined heating value of the resulting air gas. The quantity of gasoline is regulated independently of the current of air to obtain the air gas of the desired or other predetermined heating value, and the regulation of the gasoline and the air is maintained independently of the rate of consumption of the resulting air gas. Furthermore, in thus deriving an air gas purusant to my invention the temperature of the vaporizer at the location of entry of the air into the vaporizer is maintained substantially at that of the atmosphere, and preferably the temperature of the whole of the vaporizer is maintained at the temperature of the atmospheric air, thereby maintaining the vapor tension of the gasoline to be vaporized substantially corresponding to the temperature of the air at the location of entry in the vaporizer.

Furthermore pursuant to my invention, the resulting air gas is led from the vaporizer through the pipe or system of pipes to the various locations of consumption and the flow of the air gas through such pipe or pipes takes place at a temperature substantially that of the temperature of the production of the air gas, thereby preventing the condensation of any liquid in the piping system.

As far as the farmer is concerned or the man using gas engine motive power he will find it to his advantage to use motor gasoline which is today a universal commodity. He will extract from it such quantities of the lower boiling compounds as he requires for his kitchen or for other household purposes, using the higher boiling compounds for power purposes. Depending upon the size of the household, whether the gas is used only for cooking or also for lighting, ironing, or the like the consumption of gas will naturally vary. Assuming that the annual consumption of heat for cooking purposes amounts to 30,000,000 B. t. u. for the average American household this would be equal to 1500 lbs. of gasoline or roughly 240 gal. per year or 20 gal. per month. Not considering any saving in fuel by the more economical combustion of the gas by my method it would mean that a family of four persons could get along with .70 gal. of gasoline per day and figuring with a price of 20¢ per gal. for motor gasoline the cost for cooking and lighting would amount to approximately 14¢ per day as far as the fuel item is concerned.

As the proportion of the vaporized portion of the gasoline to the unvaporized portion is as 35:65, there would be available for power purposes about 37 gal. per month. As far as the average farmer is concerned, this is an amount which he can easily dispose of in his tractor, truck, and other motive power work.

It is unnecessary to go here into a discussion of the merits of the use of gas in the household in place of wood which is the common fuel on the average farm. The saving in time and labor and the greater convenience of gas, more than compensate for the additional expense for gasoline. It should however be mentioned here that the benefit derived by a better illumination in the house, which is a sore point in the average farm-life and from a national economical standpoint, that the efficiency of a gas fired stove is at least 35% whereas the efficiency of a coal fired stove is but 5% or less.

The user who has no use for the unvaporized portion of the motor gasoline, can of course use with my apparatus also gas machine gasoline, in which case the pump should be set so that approximately only .88 gal. of gasoline are sent through the vaporizer for every 1000 cubic feet of air. To those skilled in the art it will be unnecessary to explain how the best results are obtained, for any special type of gasoline. As in this case all of the gasoline will be vaporized, the storage tank for unvaporized gasoline becomes superfluous and can be replaced by a seal pot of small dimensions.

In Fig. 1, I have indicated a simple manner of assembly of a plant embodying my invention, by locating the fan, the coil and the appurtenant parts within the cellar and the gas pipe leading to an upper room to an illuminating burner, and indicating the gas piping also leading elsewhere in the house for cooking and other household purposes. The gasoline storage tank 15 may be expeditiously located in the ground at the side of the house and similarly the residue gasoline collecting tank 27. The breather pipe 16 and its U-bend 17 and the breather pipe 29 and its U-bend 28 of the tanks 15 and 27, extend above the level of the ground at convenient locations.

Whereas I have described my invention by reference to specific forms thereof, it will be understood that many changes and modifications may be made without departing from the spirit of the invention.

The standard grade of motor gasoline referred to in the specification and sold on the market today varies considerably with regard to its specific gravity. In distinction from high grade gas machine gasoline, which usually tests approximately 85° Baumé, motor gasoline at the present time usually tests approximately 57° Baumé. It must however be understood that wherever the expression is used in the claims a gasoline having a Baumé gravity of approximately 57 degrees, such expression shall comprise such higher or lower degrees as are found in the commercial product which is commonly sold under the designation of motor gasoline. Motor gasoline comprises a complex volatile inflammable liquid composed of various organic compounds. It does not possess a definite boiling point, boiling between wide ranges of temperatures. It also does not possess a definite vapor tension, some of its constituents forming with air an ignitible gas, others giving a mixture too lean to burn; hence, it can be termed as a liquid possessing partly sufficient vapor tension to form with air an ignitible gas.

Further, the physical properties of motor gasoline vary according to the source of its origin, its method of manufacture and even market conditions.

It must be clearly understood that I do not wish to be limited to any particular grade of gasoline and that I can use for my purpose other complex volatile inflammable liquids in accordance with the method described provided that these liquids contain compounds which will give with air an ignitible gas.

Such other complex compounds are, for instance, the various grades of crude oil, from which the gasoline has not yet been taken out. It will be obvious that by using a gasoline containing crude oil according to my method described, the percentage of the recovered portion of the liquid is increased but otherwise the production of the air gas is not interfered with.

Instead of a crude oil containing gasoline I can use also certain by-products of the coke and gas industry. A crude benzol possesses exactly the same qualifications for the production of air gas as a motor gasoline. It has no definite boiling point, no definite vapor tension, some of its constituents yielding readily with air an ignitible air gas, some possessing a vapor tension too low to do so. If such a crude benzol is passed through my apparatus and treated according to my method, it will be found that there will be extracted from it a certain portion in the form of an ignitible air gas and a certain portion will be recovered in the form of a liquid and can be made available for other purposes. It is further apparent that in lieu of a complex volatile inflammable liquid possessing only partly sufficient vapor tension to form with air at atmospheric temperatures an ignitible air gas, I may also use volatile inflammable liquids which possess sufficient vapor tension to form with air at atmospheric temperatures an ignitible air gas, as for instance, so-called "gas machine" or other high test gasoline, benzol, acetone, or the like.

I claim:

1. The method of producing an air gas of a substantially uniform heating value, which comprises exposing in a vaporizer without the use of a flame for heating the vaporizer, a moving thin stream of gasoline at atmospheric temperatures to a current of air of low pressure in counterdirection and in quantities substantially not greater than are required for deriving a predetermined heating value of the resulting air gas, regulating the quantity of gasoline independently of the current of air to obtain an air gas of said predetermined heating value, maintaining such regulation independently of the rate of consumption of the resulting air gas, and recovering from the vaporizer the unvaporized portion of the gasoline.

2. The method of producing an air gas of a substantially uniform heating value, which comprises exposing in a vaporizer without the use of a flame for heating the vaporizer a moving thin stream of gasoline at atmospheric temperatures to a current of air of low pressure in counterdirection and in quantities substantially not greater than are required for deriving a predetermined heating value of the resulting air gas, regulating the quantity of gasoline independently of the current of air to obtain an air gas of said predetermined heating value, maintaining such regulation independently of the rate of consumption of the resulting air gas, and continuously recovering from the vaporizer the unvaporized portion of the gasoline.

3. The method of producing an air gas of a substantially uniform heating value, which comprises exposing at atmospheric temperatures in a vaporizer without the use of a flame for heating the vaporizer a moving thin stream of gasoline over a non-absorbent surface in counterdirection to a current of air of low pressure and in quantities not larger than are required for deriving a predetermined heating value of the resulting air gas, thereby facilitating the exchange of the cold produced in the vaporizer to the surrounding atmosphere, regulating the quantity of gasoline independently of the current of air to obtain an air gas of said predetermined heating value, maintaining such regulating independently of the rate of consumption of the resulting air gas, and recovering from the vaporizer the unvaporized portion of the gasoline.

4. The method of producing an air gas of a substantially uniform heating value, which comprises exposing in a vaporizer without the use of a flame for heating the vaporizer a moving thin stream of gasoline at atmospheric temperatures to a current of air of low pressure in counterdirection and in quantities substantially not greater than are required for deriving a predetermined heating value of the resulting air gas, regulating the quantity of gasoline independently of the current of air so as to obtain a gas the oxygen content of which is substantially equal to the amount required theoretically for the complete combustion of the combustible constituents, and maintaining such composition of the resulting air gas independently of the rate of consumption of the resulting air gas, and recovering from the vaporizer the unvaporized portion of the gasoline.

5. The method of producing an air gas of a substantially uniform heating value, which comprises exposing in a vaporizer without the use of a flame for heating the vaporizer a moving thin stream of gasoline at atmospheric temperatures to a current of air of low pressure in counterdirection and in quantities substantially not greater than are required for deriving a predetermined heating value of the resulting air gas, regulating the quantity of gasoline independently of the current of air to obtain an air gas of said predetermined heating value, maintaining such regulation independently of the rate of consumption of the resulting air gas, maintaining the temperature of the vaporizer substantially at that of the atmosphere, and recovering from the vaporizer the unvaporized portion of the gasoline.

6. The method of producing an air gas of a substantially uniform heating value, which comprises exposing in a vaporizer without the use of a flame for heating the vaporizer a moving thin stream of motor gasoline having a Baumé gravity of approximately 57° at atmospheric temperatures to a current of air of low pressure in counterdirection and in quantities substantially not greater than are required for deriving a predetermined heating value of the resulting air gas, regulating the quantity of such gasoline independently of the current of air to obtain an air gas of said predetermined heating value, maintaining such regulation independently of the rate of consumption of the resulting air gas, and recovering from the vaporizer the unvaporized portion of such gasoline.

7. The method of producing an air gas of a substantially uniform heating value, which comprises exposing at atmospheric temperatures in a vaporizer without the use of a flame for heating the vaporizer a moving thin stream of motor gasoline having a Baumé gravity of approximately 57° over a non-absorbent surface in counterdirection to a current of air of low pressure and in quantities not larger than are required for deriving a predetermined heating value of the resulting air gas, thereby facilitating the exchange of the cold produced in the vaporizer to the surrounding atmosphere, regulating the quantity of such gasoline independently of the current of air to obtain an air gas of said predetermined heating value, maintaining such regulating independently of the rate of consumption of the resulting air gas, and recovering from the vaporizer the unvaporized portion of such gasoline.

8. The method of producing an air gas of a substantially uniform heating value, which comprises exposing in a vaporizer without the use of a flame for heating the vaporizer a moving thin stream of a motor gasoline having a Baumé gravity of approximately 57° at atmospheric temperatures to a current of air of low pressure in counterdirection and in quantities substantially not greater than are required for deriving a predetermined heating value of the resulting air gas, regulating the quantity of such gasoline independently of the current of air to obtain an air gas the oxygen content of which is substantially equal to the amount required theoretically for the complete combustion of the combustible constituents maintaining such composition of the resulting air gas independently of the rate of consumption of the resulting air gas, and recovering from the vaporizer the unvaporized portion of such gasoline.

9. The method of producing an air gas of a substantially uniform heating value, which comprises exposing in a vaporizer without the use of a flame for heating the vaporizer a moving thin stream of motor gasoline having a Baumé gravity of approximately 57° at atmospheric temperatures to a current of air of low pressure in counterdirection and in quantities substantially not greater than are required for deriving a predetermined heating value of the resulting air gas, regulating the quantity of such gasoline independently of the current of air to obtain an air gas of said predetermined heating value, maintaining such regulation independently of the rate of consumption of the resulting air gas, controlling the decrease in temperature resulting from the vaporization of such gasoline, and recovering from the vaporizer the unvaporized portion of such gasoline.

10. The method of making an air gas of a substantially uniform heating value, which comprises conveying from a place of storage a complex volatile inflammable liquid possessing partly sufficient vapor tension to form with air at atmospheric temperatures and low pressure an ignitible air gas, vaporizing the liquid without the use of a heating flame by passing it at atmospheric temperatures in the form of a thin moving stream in counterdirection to a current of air of low pressure and in quantities substantially not greater than are required for deriving an air gas of a predetermined heating value, regulating the quantity of the liquid independently of the current of air to thereby obtain an air gas of said predetermined heating value, maintaining such regulation independently of the rate of consumption of the resulting air gas, recovering the unvaporized residues containing the portion of the inflammable liquid possessing insufficient vapor tension, and conveying said unvaporized residues to a separate place of storage.

11. The method of making an air gas of a substantially uniform heating value, which comprises conveying from a place of storage a complex volatile inflammable liquid possessing partly sufficient vapor tension to form with air at atmospheric temperatures and low pressure an ignitible air gas, vaporizing the liquid without the use of a heating flame by passing it through a vaporizer at atmospheric temperatures in the form of a thin moving stream in counterdirection to a current of air of low pressure and in quantities substantially not greater than are required for deriving an air gas of a predetermined heating value, regulating the quantity of such liquid independently of the current of air to thereby obtain an air gas the oxygen content of which is such that the resulting air gas when ignited produces a non-smoking flame without further addition of air to the air gas after the air gas has passed the vaporizer, maintaining such regulation independently of the rate of consumption of the resulting air gas, maintaining the temperature of the vaporizer substantially that of the atmosphere, recovering the unvaporized residues containing the portion of such liquid possessing insufficient vapor tension, and conveying the unvaporized residues to a separate place of storage.

12. The method of making an air gas of predetermined and substantially uniform heating value, which comprises vaporizing a thin moving stream of a volatile inflammable liquid, by passing the same through a vaporizer at atmospheric temperatures without the use of a flame for heating the vaporizer and in counterdirection to a current of air of low pressure and in quantities substantially not larger than required for deriving an air gas of the predetermined heating value, regulating the quantity of the liquid independently of the rate of consumption of the air gas, and removing from the vaporizer any unvaporized portion of the liquid.

13. The method of making an air gas of a predetermined and substantially uniform heating value, which comprises vaporizing a thin moving stream of a volatile inflammable liquid by passing the same through a vaporizer at atmospheric temperatures without the use of a flame for heating the vaporizer and in counterdirection to a current of air of low pressure and in quantities substantially not larger than required for deriving the predetermined heating value, regulating the quantity of the liquid independently of the current of air to obtain an air gas of said predetermined heating value, maintaining such heating value independently of the rate of consumption of the air gas, maintaining the temperature of the air gas and the temperature of the air at the point of its entry into the vaporizer substantially at the temperature of the atmosphere, and removing from the vaporizer any unvaporized portion of the liquid.

In testimony whereof I have signed this specification this 24th day of February, 1925.

HANS FOERSTERLING.